US008147781B2

(12) United States Patent
Holloway et al.

(10) Patent No.: US 8,147,781 B2
(45) Date of Patent: Apr. 3, 2012

(54) RECOVERING METAL VALUES FROM A METALLIFERROUS MATERIAL

(75) Inventors: Preston Carl Holloway, Edmonton (CA); Michael Joseph Collins, Fort Saskatchewan (CA); Eugene William Yuzda, Fort Saskatchewan (CA)

(73) Assignee: Sheritt International Corporation, Fort Saskatchewan, Alberta, CA (US)

( * ) Notice: Subject to any disclaimer, the term of this patent is extended or adjusted under 35 U.S.C. 154(b) by 231 days.

(21) Appl. No.: 12/556,288

(22) Filed: Sep. 9, 2009

(65) Prior Publication Data

US 2011/0058998 A1    Mar. 10, 2011

(51) Int. Cl.
*C01G 53/00* (2006.01)
(52) U.S. Cl. .................... 423/132; 423/150.1; 423/150.4
(58) Field of Classification Search .................. 423/132, 423/150.1, 150.4
See application file for complete search history.

(56) References Cited

U.S. PATENT DOCUMENTS

| | | | | | |
|---|---|---|---|---|---|
| 3,991,159 | A | * | 11/1976 | Queneau et al. | 423/150.4 |
| 4,044,096 | A | * | 8/1977 | Queneau et al. | 423/150.4 |
| 4,515,696 | A | | 5/1985 | Matthew et al. | |
| 4,547,348 | A | | 10/1985 | Lussiez et al. | |
| 5,531,970 | A | | 7/1996 | Carlson | |
| 7,387,767 | B2 | | 6/2008 | Campbell et al. | |

FOREIGN PATENT DOCUMENTS

| | | | |
|---|---|---|---|
| EP | 0547744 A1 | | 6/1993 |
| WO | 2008/138038 | * | 11/2008 |
| WO | 2009069005 A2 | | 6/2009 |

OTHER PUBLICATIONS

Foreign communication from a related application—International Search Report and Written Opinion, PCT/CA2010/000089, May 13, 2010, 10 pages.

(Continued)

*Primary Examiner* — Steven Bos
(74) *Attorney, Agent, or Firm* — Conley Rose, P.C.; Rodney B. Carroll

(57) ABSTRACT

There is provided a method of treating a metalliferous material, comprising providing a metalliferous material including at least one target metallic element, solubilising the metalliferous material so as to effect production of an intermediate product including an operative solution. The operative solution includes a solvent component and a solute component. The solute component includes at least one solute component-based target metallic element and each one of the at least one solute component-based target metallic element corresponds to a one of the at least one target metallic element of the metalliferous material such that the operative solution includes at least one target metallic element. The operative solution is contacted with an operative reagent in an operative reaction zone so as to effect production of a product mixture including an operative reaction product and hydronium ion, wherein the operative reaction product includes at least one operative reaction product-based target metallic element and each one of the at least one operative reaction product-based target metallic element corresponds to a one of the at least one solute component-based target metallic element of the operative solution. At least one hydronium ion depletion agent is provided in the operative reaction zone such that contacting between any one of the at least one hydronium ion depletion agent and the hydronium ion in the operative reaction zone effects a reactive process which consumes the hydronium ion. Each one of the at least one hydronium ion depletion agent includes at least one dissolved aluminium complex material.

62 Claims, 2 Drawing Sheets

OTHER PUBLICATIONS

Chalkley, M. E., et al., "The acid pressure leach process for nickel and cobalt laterite. Part 1: Review of operations at Moa," Hydrometallurgy and Refining of Nickel and Cobalt, 1997, vol. 1, pp. 341-353 plus publishing info (4 pages).

Cornelis, Rita, et al., "Handbook of Elemental Speciation II, Species in the environment, food, medicine and occupational health," 2005, pp. 7-8 plus publishing info (2 pages), John Wiley and Sons Limited, West Sussex, England.

Hewitt, B., et al., "Murrin Murrin CCD1 rake mechanism modification: the decision and the result," Met. Soc., Pressure Hydrometallurgy 2004, 34th Annual Hydrometallurgy Meeting, Banff, Alberta, Canada, pp. 227-246.

Motteram, Geoff, et al., "Murrin Murrin Nickel-Cobalt project, project development overview," Presentation at Nickel/Cobalt Pressure Leaching and Hydrometallurgy Forum, May 13-14, 1996, Perth, Western Australia, 31 pages.

Tsuchida, N., et al., "Development of process design for coral bay nickel project," International Laterite Nickel Symposium, 2004, The Minerals, Metals and Materials Society, pp. 151-160.

* cited by examiner

RECOVERING METAL VALUES FROM A METALLIFERROUS MATERIAL

FIELD OF THE INVENTION

This invention relates to the recovery of one or more metal values from a metalliferrous material and, more particularly, to improving the recovery of one or more metal values from a metalliferrous material by neutralizing acid being produced during the process.

BACKGROUND OF THE INVENTION

Nickel and cobalt are recovered from laterite ores using sulphide precipitation. An example of this process is described in U.S. Pat. No. 7,387,767.

The sulphide precipitation step produces acid which has a tendency to build up in the reaction zone, thereby limiting the recoveries of nickel and cobalt by precipitation of their sulphides.

SUMMARY OF THE INVENTION

In one aspect, there is provided a method of treating a metalliferrous material, comprising providing a metalliferrous material including at least one target metallic element, solubilising the metalliferrous material so as to effect production of an intermediate product including an operative solution, wherein the operative solution includes a solvent component and a solute component, and wherein the solute component includes at least one solute component-based target metallic element and each one of the at least one solute component-based target metallic element corresponds to a one of the at least one target metallic element of the metalliferrous material such that the operative solution includes at least one target metallic element, contacting the operative solution with an operative reagent in an operative reaction zone so as to effect production of a product mixture including an operative reaction product and hydronium ion, wherein the operative reaction product includes at least one operative reaction product-based target metallic element and each one of the at least one operative reaction product-based target metallic element corresponds to a one of the at least one solute component-based target metallic element of the operative solution, wherein the operative solution being contacted in the operative reaction zone includes a total molar quantity of target metallic element in the operative reaction zone, wherein each one of the at least one solute component-based target metallic element includes a respective target metallic element molar quantity in the operative reaction zone, such that at least one respective target metallic element molar quantity is provided in the operative reaction zone, and wherein the total moles of target metallic element in the operative reaction zone is the sum of the at least one respective target metallic element molar quantity in the operative reaction zone, and providing at least one hydronium ion depletion agent in the operative reaction zone such that contacting between any one of the at least one hydronium ion depletion agent and the hydronium ion in the operative reaction zone effects a reactive process which consumes the hydronium ion, wherein each one of the at least one hydronium ion depletion agent includes at least one dissolved aluminium complex material and each one of the at least one dissolved aluminium complex material includes a respective molar quantity of operative aluminium in the operative reaction zone such that each one of the at least one hydronium ion depletion agent includes at least one respective molar quantity of operative aluminium in the operative reaction zone, and such that each one of the at least one hydronium ion depletion agent includes a subtotal operative aluminium molar quantity in the operative reaction zone defined by the sum of the respective at least one respective molar quantity of operative aluminium in the operative reaction zone such that at least one subtotal operative aluminium molar quantity in the operative reaction zone is provided, and wherein a total moles of operative aluminium in the operative reaction zone is the sum of the at least one subtotal operative aluminium molar quantity in the operative reaction zone, wherein the total moles of operative aluminium in the operative reaction zone, relative to the total moles of target metallic element in the operative reaction zone, is pre-determined.

In one aspect, there is provided a method of treating a metalliferrous material, comprising providing a metalliferrous material including at least one target metallic element, solubilising the metalliferrous material so as to effect production of an intermediate product including an operative solution, wherein the operative solution includes a solvent component and a solute component, and wherein the solute component includes at least one solute-based target metallic element and each one of the at least one solute-based target metallic element corresponds to a one of the at least one target metallic element of the metalliferrous material, such that the operative solution includes at least one target metallic element, contacting the operative solution with an operative reagent in an operative reaction zone so as to effect production of a product mixture including an operative reaction product and hydronium ion, wherein the operative reaction product includes at least one operative reaction product-based target metallic element and each one of the at least one operative reaction product-based target metallic element corresponds to a one of the at least one solute-based target metallic element of the operative solution, providing at least one hydronium ion depletion agent in the operative reaction zone for effecting contacting between the hydronium ion in the reaction zone and at least one of the at least one hydronium ion depletion agent, wherein the contacting between any one of the at least one hydronium ion depletion agent and the hydronium ion in the operative reaction zone effects a reactive process which consumes the hydronium ion, wherein at least one of the at least one hydronium ion depletion agent includes at least one dissolved aluminium complex material, recovering aluminium-comprising residue from at least one of the solubilising or contacting steps such that recovered aluminium-comprising residue is provided and the recovered aluminium-comprising residue includes recovered aluminium, subjecting at least a fraction of the recovered aluminium-comprising residue to a reactive process so as to effect production of at least one aluminium-comprising residue-derived hydronium ion depletion agent, and providing at least one of the at least one aluminium-comprising residue-derived hydronium ion depletion agent to the operative reaction zone such that at least a fraction of the at least one hydronium ion depletion agent provided in the operative reaction zone includes at least one of the at least one aluminium-comprising residue-derived hydronium ion depletion agent, such that at least a fraction of the recovered aluminium is recycled.

BRIEF DESCRIPTION OF DRAWINGS

The system and method of the preferred embodiments of the invention will now be described with the following accompanying drawings.

DETAILED DESCRIPTION

Figure 1:
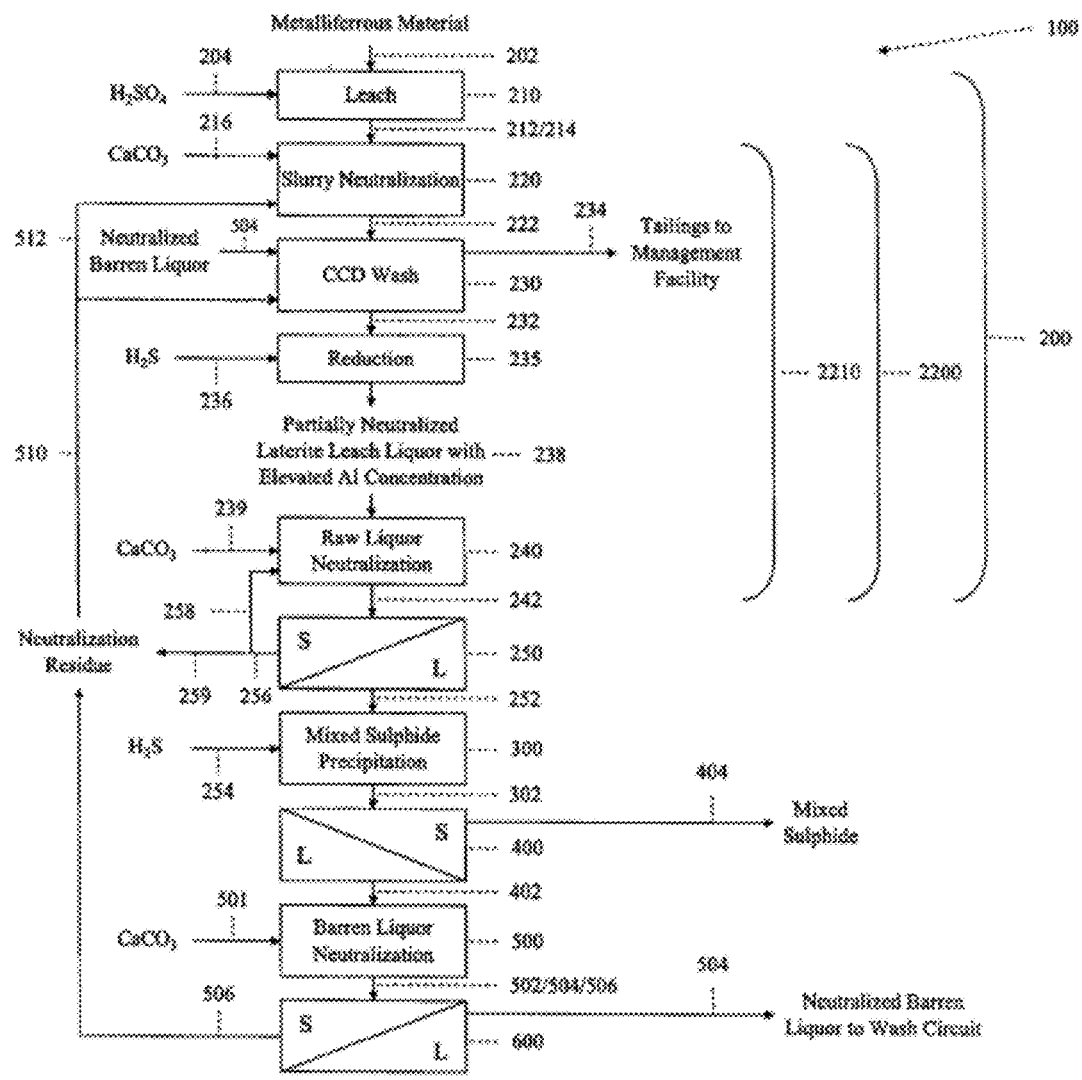
FIG. 1 is a process flow diagram of an embodiment of the invention.

Referring to FIG. 1, there is provided a method 100 of treating a metalliferous material 202.

The method includes providing a metalliferous material 202. For example, the metalliferous material 202 is an ore, a concentrate, or any other metal-containing material. For example, the metalliferous material 202 is a laterite ore. For example, the metalliferous material 202 is a laterite ore which consists primarily of limonite and, in some embodiments, includes minor amounts of saprolite minerals. As a further example, the metalliferous material includes 0.01 to 2.5% Ni, 0.01 to 2.5% Co, 1 to 20% Al, 0.1 to 5% Cr, 5 to 60% Fe, 0.01 to 25% Mg, 0.01 to 5% Mn and 0.1 to 40% Si. As a further example, the metalliferous material 202 includes 0.5 to 1.5% Ni, 0.05 to 0.2% Co, 3 to 8% Al, 1 to 3% Cr, 45 to 55% Fe, 0.1 to 2% Mg, 0.5 to 2% Mn and 1 to 5% Si.

For example, the metalliferous material 202 is conditioned such that any one of several characteristics of the metalliferous material 202 is modified to improve the suitability of the metalliferous material 202 for leaching. An exemplary characteristic which could be modified is particle size. Another exemplary characteristic which could be modified is composition.

For example, the metalliferous material 202 is metalliferrous particulate material.

The metalliferous material 202 includes at least one target metallic element. For example, the target metallic element is nickel (Ni). As a further example, the target metallic element is cobalt (Co). As a further example, the at least one target metallic element includes nickel and cobalt. As a further example, the at least one target metallic element is nickel and cobalt.

The metalliferous material 202 is solubilised by a solubilization process 200 so as to effect production of an intermediate product 242 including an operative solution 252. The operative solution 252 is an aqueous solution and includes a solvent component and a solute component. The solute component includes at least one solute component-based target metallic element. Each one of the at least one solute component-based target metallic element corresponds to a one of the at least one target metallic element of the metalliferous material such that the operative solution includes at least one target metallic element.

The operative solution 252 is contacted with an operative reagent 254 in an operative reaction zone 300 so as to effect production of a product mixture 302 including an operative reaction product and hydronium ion. The operative reaction product includes at least one operative reaction product-based target metallic element. Each one of the at least one operative reaction product target metallic element component corresponds to a one of the at least one solute component-based target metallic element.

At least one hydronium ion depletion agent is also provided in the operative reaction zone 300. Each one of the at least one hydronium ion depletion agent includes at least one dissolved aluminium complex material. Contacting between any one of the at least one hydronium ion depletion agent and the hydronium ion in the operative reaction zone 300 effects a reactive process which consumes the hydronium ion. For example, a suitable dissolved aluminium complex material includes a polynuclear aluminium species. As a further example, a suitable dissolved aluminium complex material is a compound of $Al_2(OH)_2(H_2O)_8^{4+}$.

In some embodiments, the operative solution 252 being contacted with the operative reagent 254 during the contacting of the operative solution 252 with the operative reagent 254 in the operative reaction zone 300 is separated from the intermediate product 242 prior to the contacting with the operative reagent 254.

In some embodiments, at least a fraction of the at least one operative reaction product is a solid reaction product.

In some embodiments, the operative reagent 254 includes an acid producing sulphide reagent, such as gaseous hydrogen sulphide. Other suitable examples of acid producing sulphide reagents include sodium hydrosulphide, ammonium hydrosulphide, and potassium hydro sulphide.

In some embodiments, the method further includes separating at least a fraction of the at least one operative reaction product from the product mixture 302. For example, the separation is a solid-liquid separation process.

In some embodiments, the method further includes: (i) separating a target metallic element depleted solution product 402 from the product mixture in a solid-liquid separator 400, and (ii) contacting the target metallic element depleted solution product 402 with a neutralizing agent 501 in a residual product treatment zone 500 to effect production of a residual slurry 502 including a residual operative solution 504 and target metallic element depleted solution product-derived solid aluminium comprising residue 506. Relative to the target metallic element depleted solution product 402, the residual operative solution 504 is characterized by a higher pH.

In some embodiments, the aluminium of at least a fraction of the at least one hydronium ion depletion agent provided in the operative reaction zone 300 is derived from the metalliferous material 202. In this respect, for example, the metalliferous material 202 further includes at least one metalliferrous material-based aluminium-comprising component, wherein the metalliferous material-based aluminium-comprising component includes metalliferous material-based aluminium, such that the metalliferous material 202 further includes metalliferous material-based aluminium. For example, a one of the at least one metalliferous material-based aluminium component is gibbsite $[Al(OH)_3]$. In some embodiments, at least a fraction of the at least one metalliferrous material-originating aluminium-comprising solid material includes aluminium hydroxide, and the aluminium of at least a fraction of the at least one hydronium ion depletion agent provided in the operative reaction zone is derived from the aluminium hydroxide.

When aluminium of at least a fraction of the at least one hydronium ion depletion agent is derived from the metalliferous material 202, in some embodiments, the metalliferrous material 202 also includes aluminium, and the solubilising of the metalliferous material 202 includes: (i) leaching the metalliferous material 202 with a leachant 204 in a leaching zone 210 so as to effect production of a leachate 212 including the at least one solute component-based target metallic element and aluminium, and (ii) contacting a neutralizing agent with the leachate 212 in a neutralization process 2200 so as to effect production of at least one leachate-derived hydronium ion depletion agent, wherein each one of the at least one leachate-derived hydronium ion depletion agent includes aluminium derived from the metalliferrous material. In some embodiments, the leachant 204 includes an acidic solution. For example, a suitable leachant 204 includes concentrated sulphuric acid. At least one of the at least one hydronium ion depletion agent provided in the operative reaction zone 300 is a one of the at least one leachate-derived hydronium ion depletion agent. In some embodiments, the production of the at least one leachate-derived hydronium ion depletion agent is effected by the contacting of the leachate 212 with the neutralizing agent. In this respect, the contacting of the leachate 212 with the neutralization agent effects production of an operative solution 252 including the at least one leachate-derived hydronium ion depletion agent. In some embodiments, the pH of the operative solution 252 is at least 3.3. For example, the pH of the operative solution 252 is between 3.3 and 4.0. As a further example, the pH of the operative solution 252 is between 3.8 and 4.0. Relative to the leachate 212, the operative solution 252 is characterized by a high pH. For example, a suitable neutralizing agent 239 is calcium carbonate. As a further example, a suitable neutralizing agent 239 is limestone.

When aluminium of at least a fraction of the at least one hydronium ion depletion agent is derived from the metalliferrous material 202, in some embodiments, the metalliferrous material 202 also includes at least one metalliferrous material-based aluminium-comprising component, wherein the metalliferrous material-based aluminium-comprising component includes metalliferrous material-based aluminium, and the solubilising includes: (i) in a leaching zone 210, leaching the metalliferrous material 202 with a leachant 204 including an aqueous acidic solution so as to effect production of a leachate 212 including a dissolved metalliferrous material-derived aluminium comprising solute, wherein the dissolved metalliferrous material-derived aluminium comprising solute includes aluminium of the metalliferrous material-based aluminium, and (ii) subjecting at least a fraction of the dissolved metalliferrous material-derived aluminium comprising solute to a reactive process 2210 so as to effect production of at least one metalliferrous material-derived hydronium ion depletion agent, wherein each one of the at least one metalliferrous material-derived hydronium ion depletion agent includes aluminium of the metalliferrous material-based aluminium. In some embodiments, the leachant 204 includes an acidic solution. For example, a suitable leachant 204 includes concentrated sulphuric acid. At least a fraction of the at least one hydronium ion depletion agent provided in the operative reaction zone 300 includes at least one of the at least one metalliferrous material-derived hydronium ion depletion agent. In some embodiments, at least a fraction of the metalliferrous material-based aluminium-comprising component includes aluminium hydroxide. In some embodiments, the subjecting of at least a fraction of the dissolved metalliferrous material-derived aluminium-comprising solute to a reactive process so as to effect production of at least one metalliferrous material-derived hydronium ion depletion agent includes contacting the leachate 212 with a neutralizing agent to effect production of the operative solution 252. In some embodiments, the pH of the operative solution 252 is at least 3.3. For example, the pH of the operative solution 252 is between 3.3 and 4.0. As a further example, the pH of the operative solution 252 is between 3.8 and 4.0. Relative to the leachate 212, the operative solution 252 is characterized by a higher pH. For example, a suitable neutralizing agent 239 is calcium carbonate. As a further example, a suitable neutralizing agent 239 is limestone.

When aluminium of at least a fraction of the at least one hydronium ion depletion agent is derived from the metalliferrous material 202, in some embodiments, the metalliferrous material 202 also includes at least one metalliferrous material-based aluminium-comprising component, wherein the metalliferrous material-based aluminium-comprising component includes metalliferrous material-based aluminium, and the solubilising includes: (i) in a leaching zone 210, leaching the metalliferrous material 202 with a leachant 204 including an aqueous acidic solution so as to effect production of an intermediate slurry product 214 including a leachate 212, wherein the leachate 212 includes a dissolved metalliferrous material-derived aluminium-comprising solute, wherein the dissolved metalliferrous material-derived aluminium-comprising solute includes aluminium of the metalliferrous material-based aluminium, (ii) contacting the intermediate slurry product 214 with a neutralizing agent 216 in a first neutralization zone 220 so as to effect production of a treated intermediate slurry product 222, (iii) separating a leachate-derived intermediate operative solution 232 from the treated intermediate slurry product 222 in a separation zone 230, and (iv) subjecting the leachate-derived intermediate operative solution 232 to a reactive process, wherein a neutralizing agent 239 is provided in a second neutralization zone 240, and wherein the reactive process includes consumption of at least a fraction of the neutralizing agent 239 so as to effect production of a leachate-derived operative solution 252 and a post-neutralization aluminium-comprising solid residue 256, wherein the leachate-derived operative solution 252 includes at least one metalliferrous material-derived hydronium ion depletion agent, wherein each one of the at least one metalliferrous material-derived hydronium depletion agent includes aluminium of the metalliferrous material-based aluminium, and wherein at least a fraction of the at least one hydronium ion depletion agent provided in the operative reaction zone 300 includes at least one of the at least one metalliferrous material-derived hydronium ion depletion agent. In some embodiments, the pH of the leachate-derived operative solution 252 is at least 3.3. For example, the pH of the leachate-derived operative solution 252 is between 3.3 and 4.0. As a further example, the pH of the leachate-derived operative solution 252 is between 3.8 and 4.0. Relative to the leachate-derived intermediate operative solution 232, the leachate-derived operative solution 252 is characterized by a higher pH.

In some embodiments, the aluminium of at least a fraction of the at least one hydronium ion depletion agent provided in the operative reaction zone 300 is derived from an external aluminium-comprising source which is independent of the metalliferrous material and which is introduced upstream of the operative reaction zone 300. For example, the external aluminium-comprising source is an aluminium-comprising solution which is supplied to the second neutralization zone 240. As a further example, the external aluminium-comprising source is acid-soluble aluminium comprising solid material which is dissolved and supplied to second neutralization zone 240.

In some embodiments, the treated intermediate slurry product 222 is contacted with a wash solution in the separation zone 230 so as to effect mass transfer of dissolved material from the treated intermediate slurry product 222 to the wash solution so as to effect production of the leachate-derived intermediate operative solution 232, wherein the wash solution includes at least a fraction of the residual operative solution 504, described above. In this respect, in some of these embodiments, the contacting is effected while the treated intermediate slurry product 222 is flowing though the separation zone 230 in a direction opposite to that of the flowing of the wash solution.

In some embodiments, when the metalliferrous material 202 includes 0.9 to 1.5% Ni, 0.05 to 0.18% Co, 3 to 5% Al, 1.5 to 2% Cr, 45 to 53% Fe, 0.1 to 1.5% Mg, 0.5 to 1.2% Mn and 0.9 to 3% Si, the leachant 204 is concentrated sulphuric acid (which becomes diluted by the water in the slurry of the metalliferrous material), and the leaching of the metalliferrous material 202 by the leachant 204 is effected in a leaching zone 210, wherein the metalliferrous material 202 is contacted by the leachant 204 in the leaching zone 210. The leaching zone 210 is characterized by a predetermined temperature and a predetermined pressure. For example, the temperature within the leaching zone 210 is between 240 degrees Celsius and 300 degrees Celsius. As a further example, the temperature within the leaching zone 210 is between 250 degrees Celsius and 270 degrees Celsius. For example, the temperature within the leaching zone 210 is 260 degrees Celsius. For example, with respect to the pressure within the leaching zone 210, the pressure is equal to, or higher than, the steam pressure of the leaching zone solution (that solution provided in the leaching zone 210 when the metalliferrous material 202 is contacted with the leachant 204 in the leaching zone 210) in the leaching zone 210 at the temperature of the leaching zone 210. For example, when the temperature within the leaching zone 210 is between 240 degrees Celsius and 300 degrees Celsius, the pressure in the leaching zone 210 is between 450 psig and 1300 psig. For example, the leaching is a continuous operation effected in a reaction vessel, and the retention time is between 30 minutes and 120 minutes. As a further example, the retention time is between 60 minutes and 90 minutes.

Each of the above-described embodiments includes at least one of the following features.

1. Feature Relating to the Relative Quantities of Operative Aluminium and Target Metallic Element in the Operative Reaction Zone In some embodiments, there is provided a feature which relates to the relative total quantities of operative aluminium and target metallic element in the operative reaction zone. In this respect, the provided feature is that the total moles of operative aluminium in the operative reaction zone 300, relative to the total moles of target metallic element in the operative reaction zone 300, is pre-determined.

The operative solution being contacted in the operative reaction zone 300 includes a total molar quantity of target metallic element in the operative reaction zone. Each one of the at least one solute component-based target metallic element includes a respective target metallic element molar quantity in the operative reaction zone 300. In this respect, at least one respective target metallic element molar quantity is provided in the operative reaction zone 300, and the total moles of target metallic element in the operative reaction zone 300 is the sum of the at least one respective target metallic element molar quantity in the operative reaction zone 300.

Each one of the at least one dissolved aluminium complex material includes a respective molar quantity of operative aluminium in the operative reaction zone 300. In this respect, each one of the at least one hydronium ion depletion agent includes at least one respective molar quantity of operative aluminium in the operative reaction zone 300. In this respect, each one of the at least one hydronium ion depletion agent includes a subtotal operative aluminium molar quantity in the operative reaction zone defined by the sum of the respective at least one respective molar quantity of operative aluminium in the operative reaction zone 300. In this respect, at least one subtotal operative aluminium molar quantity in the operative reaction zone 300 is provided, and the total moles of operative aluminium in the operative reaction zone 300 is the sum of the at least one subtotal operative aluminium molar quantity in the operative reaction zone 300.

In some embodiments, the total moles of operative aluminium in the operative reaction zone 300, relative to the total moles of target metallic element in the operative reaction zone 300, is controlled within a predetermined range.

In some embodiments, the ratio of: (i) the total moles of operative aluminium in the operative reaction zone 300, to (ii) the total moles of target metallic element in the operative reaction zone 300 is between 0.45 and 4.4. For example, the ratio is between 0.85 and 2.2. For example, when the target metallic elements provided in the metalliferrous material 202 are nickel and cobalt, and the concentration of nickel and cobalt in the operative reaction zone is less than 5 grams per liter, the concentration of operative aluminium in the operative reaction zone is between 2 grams per liter and 5 grams per liter.

2. Feature Relating to the Recovery and Recycling of Residual Aluminium

In some embodiments, there is provided a feature which relates to the recovery and recycling of residual aluminium.

In this respect, in some embodiments, the method further includes recovering at least one residual aluminium-comprising residue from at least one of the solubilising process 200 or the operative reaction zone 300, steps such that recovered aluminium-comprising residue is provided and the recovered aluminium-comprising residue includes recovered aluminium. At least a fraction of the recovered aluminium-comprising residue is subjected to a reactive process so as to effect production of at least one aluminium-comprising residue-derived hydronium ion depletion agent. At least one of the at least one aluminium-comprising residue-derived hydronium ion depletion agent is provided to the operative reaction zone 300 such that at least a fraction of the at least one hydronium ion depletion agent provided in the operative reaction zone 300 includes at least one of the at least one aluminium-comprising residue-derived hydronium ion depletion agent, such that at least a fraction of the recovered aluminium is recycled.

In some embodiments, the recovered aluminium-comprising residue 510 includes at least a fraction of the target metallic element depleted solution product-derived solid aluminium comprising residue 506. In some embodiments, the recovered aluminium-comprising residue 510 includes at least a fraction of the post-neutralization aluminium-comprising solid residue 259.

In some embodiments, at least a fraction of the recovered aluminium-comprising residue 510 is acid-soluble. For example, the recovered aluminium-comprising residue 510 includes aluminium hydroxide.

In some embodiments, there is provided an operative acid-soluble solid aluminium-comprising residue 512, wherein the operative acid-soluble solid aluminium-comprising residue is at least a fraction of the recovered aluminium-comprising residue 510. The operative acid-soluble solid aluminium-comprising residue 512 is subjected to a reactive process so as to effect production of at least one of the at least one aluminium-comprising residue-derived hydronium ion depletion agent, wherein the subjecting of the operative acid-soluble solid aluminium-comprising residue 512 to a reactive process includes: (i) contacting the operative acid-soluble solid aluminium-comprising residue 512 with an aqueous acidic solution so as to effect solubilisation of the operative acid-soluble solid aluminium-comprising residue and thereby effect production of a dissolved residue-derived aluminium-comprising solute dissolved in aqueous acidic solution, and (ii) contacting the aqueous acidic solution, in which the dissolved residue-derived aluminium-comprising solute is dissolved, with a neutralizing agent so as to effect production of at least a fraction of the at least one aluminium-comprising residue-derived hydronium ion depletion agent. For example, from step (i), the aqueous acidic solution in which the dissolved residue-derived aluminium-comprising solute is dissolved includes 0.05 to 50 g/L $H_2SO_4$, and as a further example includes 0.05 to 10 g/L $H_2SO_4$. In some embodiments, the produced at least a fraction of the at least one aluminium-comprising residue-derived hydronium ion depletion agent is dissolved in a solution characterized by a pH of between 3.3 and 4.0. For example, this pH is between 3.8 and 4.0. In some embodiments, the aqueous acidic solution with which the operative acid-soluble solid aluminium-comprising residue is contacted is the leachate 212 from the leaching zone 210.

3. Description of an Embodiment

Referring to FIG. 1, in one embodiment, there is provided a method of treating a laterite ore 202. The laterite ore 202 includes 0.5 to 1.5% Ni, 0.05 to 0.2% Co, 3 to 8% Al, 1 to 3% Cr, 45 to 55% Fe, 0.1 to 2% Mg, 0.5 to 2% Mn and 1 to 5% Si.

The laterite ore 202 is contacted with a leachant 204 in a leaching zone 210 to effect leaching of the laterite ore. The leachant 204 is concentrated sulphuric acid (which becomes diluted during the leaching process by the water in the slurry of the metalliferrous material). For example, concentrated sulphuric acid is added to between 50 and 500 kg of acid per tonne of ore processed in the leaching zone. For example, sufficient sulphuric acid is added to the leaching zone to give 20 to 50 g/L of dissolved sulphuric acid in the leachate 212 leaving the leaching zone, as measured at 25° C. The leaching is effected at a temperature of between 240 degrees Celsius and 300 degrees Celsius, and at a pressure equal to, or great than, the steam pressure of the solution in the leaching zone at the temperature of the leaching zone 210. For example, the leaching is effected at a temperature of between 250 degrees Celsius and 270 degrees Celsius, such as 260 degrees Celsius. The pressure of the leaching zone 210 is dependent on the temperature because steam is the primary pressurizing gas. The range of suitable operating pressure represents the range of steam pressures across the above-mentioned temperature range. For example, when the temperature in the leaching zone is between 250 degrees Celsius and 270 degrees Celsius, the suitable operating pressure is between 450 psig and 1300 psig. The leach can be operated at a higher pressure than the steam pressure but not below it. The leaching is a continuous operation with a retention time in the continuous leaching vessel of 30 to 120 minutes. For example, the retention time is between 60 and 90 minutes. The leaching effects production of a leach discharge slurry 214.

The leach discharge slurry 214 is introduced to the first neutralization zone 220. As well, aluminium-comprising materials 512 (which also include iron and chromium), being recycled from downstream unit operations (described in further detail below), is also introduced to the first neutralization zone 220. Limestone 216 is also introduced to the first neutralization zone 220. The temperature within the first neutralization zone 200 is between 90 degrees Celsius and 95 degrees Celsius. Contacting is effected between the leach discharge slurry, the recycled aluminium comprising materials, and the limestone in the first neutralization zone 220 so as to effect production of a treated intermediate slurry product 222. Relative to the leach discharge slurry, the treated intermediate slurry product 222 is characterized by a higher pH. The treated intermediate slurry product 222 includes an acidity of between 0 and 10 g/L $H_2SO_4$ in solution, as measured at 25° C., using a retention time of 30 to 60 minutes. In this respect, the contacting effects neutralization. As well, the contacting effects dissolution of at least a fraction of the metal component fraction of the recycled aluminium-comprising material 512 in accordance with the following reactions:

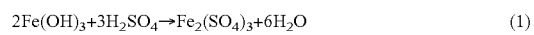
$$2Fe(OH)_3 + 3H_2SO_4 \rightarrow Fe_2(SO_4)_3 + 6H_2O \quad (1)$$

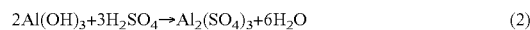
$$2Al(OH)_3 + 3H_2SO_4 \rightarrow Al_2(SO_4)_3 + 6H_2O \quad (2)$$

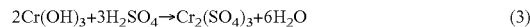
$$2Cr(OH)_3 + 3H_2SO_4 \rightarrow Cr_2(SO_4)_3 + 6H_2O \quad (3)$$

The dissolved aluminium, in the form of $Al_2(SO_4)_3$, is available for use in providing desired conditions for enhancing recoveries of metal and cobalt values.

Amongst other things, this unit operation is intended to neutralize free acid and produce a slurry where the solids have good solid-liquid separation properties (the gypsum solids produced at the higher temperature in this unit operation will have better settling properties). As well, by at least partially neutralizing the acid of the leach discharge slurry, the cost of downstream unit operations is reduced, as less expensive materials may be employed in the construction of such downstream unit operations owing to the fact that acidity of the intermediate slurry product is being reduced.

The treated intermediate slurry product 222 is discharged from the first neutralization unit operation 220 and introduced to a counter-current decantation wash circuit 230 defining a counter-current decantation wash circuit separation zone. The counter-current decantation wash circuit 230 effects separation of dissolved metal values from the treated intermediate slurry product 222, thereby leaving a treated intermediate slurry product remainder 234 including residual solids. To effect the separation, a wash solution is contacted with the treated intermediate slurry product 222 in the separation zone so as to effect mass transfer of dissolved material from the treated intermediate slurry product 222 to the wash solution and thereby effect production of a leachate-derived intermediate operative solution 232. The composition of the leachate-derived intermediate operative solution 232 varies widely, depending on the feed material being treated, the composition of the wash solution, and the proportion of wash solution to feed material. The leachate-derived intermediate operative solution 232 includes the target metallic elements and aluminium, and their dissolved sulphate salts. The contacting is effected between the wash solution and the leachate-derived intermediate slurry product 222 while the leachate-derived intermediate slurry product 222 is flowing though the separation zone in a direction opposite to that of the flowing of the wash solution. The wash solution consists of a recycle from a downstream target metallic element depleted solution neutralization unit operation, as will be described in further detail below. In addition to effecting separation of dissolved metal values from the leachate-derived intermediate slurry product 222, the countercurrent decantation wash circuit receives recycled nickel and cobalt materials precipitated in a downstream second neutralization process, as will be described in further detail below, and effects solubilisation of the recycled nickel and cobalt materials in accordance with the following reactions:

$$Ni(OH)_2 + H_2SO_4 \rightarrow NiSO_4 + 2H_2O \quad (4)$$

$$Co(OH)_2 + H_2SO_4 \rightarrow CoSO_4 + 2H_2O \quad (5)$$

The leachate-derived intermediate operative solution 232 is discharged from the countercurrent decantation wash circuit separation zone 230 and introduced to a chromium (VI) reduction unit operation including a chromium (VI) reduction reaction zone 235. Depending on the relative amounts present, chromium (VI) can be toxic and, in some instances, must be removed to satisfy environmental regulations. Also, if chromium (VI) is not removed before the sulphide precipitation unit operation, elemental sulphur will be formed in sulphide precipitation which will contaminate the mixed sulphide product. The leachate-derived intermediate operative solution 232 is contacted with a chromium (VI) reducing agent 236 to effect production of a reducing agent-treated intermediate operative solution 238. The contacting is effected under atmospheric conditions and at a temperature of between 20 degrees Celsius and 95 degrees Celsius, that is, at lower temperature and pressure than in the operative reaction zone 300 of the sulphide precipitation operation. For example, a suitable temperature for the contacting is between 65 degrees Celsius and 85 degrees Celsius. Sufficient chromium (VI) reducing agent 236 is added to effect substantially complete reduction of available dissolved chromium (VI) and at least a fraction of the available dissolved Fe(III). The contacting effects reduction of dissolved chromium (VI) to dissolved chromium (III) (see reaction (6), set out below) and dissolved Fe(III) to dissolved Fe(II) (see reaction (7), set out below). For example, a suitable chromium (VI) reducing agent 236 is an acid producing sulphide reagent such as dissolved hydrogen sulphide gas. However, the addition rate of the chromium (VI) reducing agent 236 in the chromium (VI) reduction reaction zone 235 is preselected such that precipitation of nickel and cobalt values from the intermediate operative solution 232 is minimal, so as to have a minimal impact on the recoveries of nickel and cobalt values in the downstream sulphide precipitation unit operation, which is described in further detail below. That is, sufficient chromium (VI) reducing agent 236 is added to account for stoichiometric reaction with chromium (VI) and a fraction of the Fe(III) in solution; insufficient chromium (VI) reducing agent 236 is added to react with nickel and cobalt in solution.

$$2H_2CrO_4 + 3H_2S + 3H_2SO_4 \text{---} > Cr_2(SO_4)_3 + 3S^0 + 8H_2O \quad (6)$$

$$Fe_2(SO_4)_3 + H_2S \text{---} > 2FeSO_4 + H_2SO_4 + S^0 \quad (7)$$

The chromium (VI) reduction unit operation can be removed from the presently described embodiment, in which case chromium (VI) would be reduced to chromium (III) during the below-described sulphide precipitation unit operation, and additionally result in production of elemental sulphur which would contaminate the mixed sulphide product.

The reducing agent-treated intermediate operative solution 238 is discharged from the chromium (VI) reduction unit operation and introduced to a second neutralization unit operation including a second neutralization zone 240. The reducing agent-treated intermediate operative solution is contacted with limestone 239 to effect production of an operative slurry 242. Relative to the reducing agent-treated intermediate operative solution 238, the operative slurry 242 is characterized by a higher pH. In this respect, the contacting effects neutralization. The pH of the operative slurry 242 is between 3.3 and 4.0. For example, the pH of the operative slurry 242 is between 3.8 and 4.0. The retention time for this unit operation is between 60 minutes and 120 minutes. The temperature within the second neutralization zone is between 25 degrees Celsius and 90 degrees Celsius. For example, a suitable temperature within the second neutralization zone is between 65 degrees Celsius and 85 degrees Celsius. Amongst other things, the increasing of the pH effects production of hydronium ion depletion agent in the form of a polynuclear aluminium compound.

$$Al_2(SO_4)_3 + CaCO_3 + 11H_2O \rightarrow Al_2(OH)_2(H_2O)_8(SO_4)_2 + CO_2 + CaSO_4 \cdot 2H_2O \quad (8)$$

Also, the increasing of the pH effects hydrolysis and precipitation of aluminum and impurities, such as Fe(III), Cr(III), and silica in accordance with the following reactions:

$$Fe_2(SO_4)_3 + 6H_2O \rightarrow 2Fe(OH)_3 + 3H_2SO_4 \quad (9)$$

$$Al_2(SO_4)_3 + 6H_2O \rightarrow 2Al(OH)_3 + 3H_2SO_4 \quad (10)$$

$$Cr_2(SO_4)_3 + 6H_2O \rightarrow 2Cr(OH)_3 + 3H_2SO_4 \quad (11)$$

$$H_2SO_4 + CaCO_3 + H_2O \rightarrow CaSO_4 \cdot 2H_2O + CO_2 \quad (12)$$

The operative slurry 242 is discharged from the second neutralization unit operation and introduced to a solid/liquid separation unit operation 250 in the form of a thickener. An operative solution 252 is separated from the operative slurry 242 in the thickener so as to provide a target metallic element depleted slurry remainder 256. A fraction 258 of the target metallic element depleted slurry remainder 256 is recycled to the second neutralization unit operation 240 so as to provide seed particles for impurities being precipitated during the second neutralization unit operation 240 and thereby effect formation of precipitates of relatively larger particle size. The fraction 258 recycled to the second neutralization unit 240 also includes unreacted limestone, and thereby improves limestone usage efficiencies. The fraction 258 recycled to the second neutralization unit operation 240 also includes aluminium, and this aluminium could be redissolved in the second neutralization unit operation 240 when contacted with the acidic reducing agent-treated intermediate operative solution being supplied to the second neutralization unit operation 240. The re-dissolution of aluminium of the recycle fraction could be effected where the second neutralization unit operation is effected in a plurality of tanks which are fluidly coupled in series. In this case, the initial tanks in the series are operated at a lower pH than the downstream tanks in the series, thereby facilitating the re-dissolution of aluminium of the recycle fraction. Another fraction 259 of the target metallic element depleted slurry remainder 256, a post-neutralization aluminium-comprising solid residue 259, is recycled to the first neutralization unit operation 220 and/or the countercurrent decantation wash circuit 230 to increase the concentration of dissolved aluminium which would be available for enhancing the recovery of nickel and cobalt values.

The operative solution 252 is discharged from the thickener 250 and introduced to the sulphide precipitation unit operation including the operative reaction zone 300. The operative solution 252 is contacted with gaseous hydrogen sulphide 254 in the operative reaction zone 300 to effect production of a product slurry including a mixed metal sulphide intermediate including nickel sulphide and cobalt sulphide. The contacting is effected at a temperature of between 80 degrees Celsius and 120 degrees Celsius, and at a hydrogen sulphide overpressure of between 50 kPa and 750 kPa. For example, the contacting is effected at a temperature of 105 degrees Celsius, and at a hydrogen sulphide partial pressure of between 100 kPa and 200 kPa. The retention time in the continuous sulphide precipitation reaction vessel is between 10 and 60 minutes. The contacting between the operative solution 252 and the gaseous hydrogen sulphide 254 effects production of a metal sulphide in accordance with the following reaction:

$$M^{2+}+H_2S \rightarrow MS+2H^+, \text{ where } M=Ni, Co, Cu, Zn \quad (13)$$

The produced hydronium ion reacts with polynuclear aluminium species in the operative reaction zone 300, and thereby neutralizing the produced hydronium ion, in accordance with the following reaction:

$$2H^+ + Al_2(OH)_2(H_2O)_8^{4+} \rightarrow 10H_2O + 2Al^{3+} \quad (14)$$

The neutralization of at least a fraction of the hydronium ion produced by the polynuclear aluminium species effects a shift in equilibrium of the sulphide precipitation reaction, thereby leading to higher extents of the precipitation of metals, and particularly nickel and cobalt, from the operative solution.

In some embodiments, using polynuclear aluminium compounds to neutralize acid during sulphide precipitation minimizes the effect of fluctuations in the nickel and cobalt concentration of the feed solution on the recovery of nickel and cobalt. Tests indicate that there is a threshold aluminium concentration in solution, for a given concentration of nickel and cobalt in the feed solution, where the maximum nickel and cobalt recoveries are reached, and that higher aluminium concentrations are not deleterious to nickel and cobalt recoveries. Thus, operating at aluminium concentrations above this threshold would allow high nickel and cobalt recoveries to be maintained, even with significant variation in the concentration of nickel and cobalt in the feed solution.

The operative slurry 302 is discharged from the sulphide precipitation unit operation and introduced to a solid/liquid separation unit including a separation zone 400. For example, the solid/liquid separation is effected by filtration or thickening or a combination of filtration and thickening. The mixed metal sulphide intermediate 404 is separated from the operative slurry 302 to effect production of a target metallic element depleted solution 402. The mixed metal sulphide 404 is further processed or refined to recover nickel and cobalt values.

The target metallic element depleted solution 402 is discharged from the separation zone 400 and introduced to the target metallic element depleted solution neutralization unit operation 500. The target metallic element depleted solution 402 is contacted with limestone 501 to effect neutralization of at least a fraction of the acid produced during the sulphide precipitation unit operation and thereby provide a wash solution for the countercurrent decantation wash circuit 230 of sufficiently low acidity to limit redissolution of iron from the solids in the countercurrent decantation wash circuit 230. Conditions in the counter-current decantation wash 230 are selected so as to be sufficiently acidic in order to redissolve nickel and cobalt values from the solids in the slurry recycle to the counter-current decantation circuit 230 from the second neutralization zone 240 but not so acidic as to effect an undesirable degree of re-dissolution of iron and aluminum from the solids from the first neutralization zone 220 and thereby enable these elements to be bled from the process, should such a bleed be required to maintain species, such as dissolved iron and aluminum, in balance. The reaction between the target metallic element depleted solution 402 and the limestone 501 in the target metallic element depleted solution neutralization unit operation is effected at a temperature of between 20 degrees Celsius and 95 degrees Celsius, with a retention time of between 30 minutes and 60 minutes such that the wash solution includes 0.05 to 10 grams per liter of free sulphuric acid. In an alternative mode, neutralization may be effected to effect production of a residual slurry 502 including a higher pH, namely a pH of between 3 and 7, and effect the precipitation of aluminium-comprising solids. In the first described mode (not illustrated), a first mode residual slurry (neutralized target metallic element depleted solution and small amounts of precipitated gypsum solids) is produced, and the first mode residual slurry is recycled as the wash solution to the counter-current decantation wash circuit 230. In the second-described mode (that which is illustrated in FIG. 1), a second mode residual slurry 502 is produced, and a target metallic element depleted solution product-derived solid aluminium-comprising residue 506 is separated in a solid/liquid separator 600 from the second mode residual slurry 502 to leave a predominantly liquid-comprising product including a residual operative solution 504. The target metallic element depleted solution product-derived solid aluminium-comprising residue 506 is recycled to the first neutralization unit operation 220 so as to re-dissolve the aluminium and thereby make it available for enhancing cobalt and nickel recoveries. The predominantly liquid-comprising product 504 is recycled as the wash solution to the counter-current decantation wash circuit 230.

4. Examples

Further embodiments will now be described in further detail with reference to the following non-limitative examples.

Example No. 1

A solution was prepared containing the following nominal composition (g/L): 5.4 Al, 0.4 Co, 0.2 $Cr^{3+}$, 1.0 $Fe^{3+}$, 1 Mg, 4.8 Mn, 4.6 Ni and 2.5 $H_2SO_4$. The solution was neutralized to a series of pH targets at 25° C. with the addition of limestone. After neutralization, the resulting slurry was filtered to remove the precipitated solids from the solution. The following table shows the analyses of the solutions after neutralization.

| | Limestone | | Neutralized Solution Analysis, g/L | | | | | | |
|---|---|---|---|---|---|---|---|---|---|
| Test | Added, g/L | pH | Ni | Co | Al | Cr | Fe | Mg | Mn |
| 1-N1 | 0.7 | 2.41 | 4.61 | 0.42 | 5.40 | 0.19 | 0.86 | 1.11 | 4.66 |
| 1-N2 | 2.3 | 2.68 | 4.51 | 0.41 | 5.30 | 0.17 | 0.38 | 1.10 | 4.59 |
| 1-N3 | 3.4 | 2.68 | 4.46 | 0.41 | 5.19 | 0.16 | 0.35 | 1.09 | 4.56 |
| 1-N4 | 5.8 | 3.22 | 4.40 | 0.41 | 5.14 | 0.15 | 0.21 | 1.10 | 4.52 |
| 1-N5 | 6.7 | 3.28 | 4.56 | 0.41 | 5.30 | 0.18 | 0.83 | 1.14 | 4.64 |
| 1-N6 | 33.3 | 3.95 | 4.68 | 0.43 | 3.12 | 0.05 | 0.02 | 1.21 | 4.78 |

These solutions were then treated by sulphide precipitation. Sulphide precipitation was carried out at 105° C. and 220 kPa(g) (i.e., an $H_2S$ partial pressure of 200 kPa) for 30 minutes. Mixed sulphide seed ground to 90% passing 38 μm was added to each batch test at a mole ratio of nominally 4.0:1 to the theoretical maximum nickel and cobalt sulphide that could be precipitated from solution in each test. The following table shows the results from these tests.

| Test | Feed pH | Feed Solution, g/L | | | $H_2SO_4$, g/L | | Final Solution, mg/L | | Precipitation, % | |
|---|---|---|---|---|---|---|---|---|---|---|
| | | Ni | Co | Al | Theor.[1] | Final | Ni | Co | Ni | Co |
| 1-SP1 | 2.41 | 4.61 | 0.42 | 5.40 | 11.4 | 11.7 | 51.0 | 50.0 | 98.9 | 88.0 |
| 1-SP2 | 2.68 | 4.51 | 0.41 | 5.30 | 9.3 | 11.5 | 43.0 | 44.0 | 99.0 | 89.3 |
| 1-SP3 | 2.68 | 4.46 | 0.41 | 5.19 | 9.1 | 10.8 | 32.0 | 31.0 | 99.3 | 92.4 |
| 1-SP4 | 3.22 | 4.40 | 0.41 | 5.14 | 8.3 | 10.2 | 29.0 | 27.0 | 99.3 | 93.3 |
| 1-SP5 | 3.28 | 4.56 | 0.41 | 5.30 | 9.7 | 5.9 | 16.0 | 6.9 | 99.6 | 98.3 |
| 1-SP6 | 3.95 | 4.68 | 0.43 | 3.12 | 8.5 | 3.2 | 10.0 | 3.7 | 99.8 | 99.1 |

[1]Stoichiometric acid concentration in barren liquor from precipitation of nickel and cobalt and reduction of $Fe^{3+}$ to $Fe^{2+}$ and free acid in feed solution.

A significant increase in nickel and cobalt recovery, and a significant decrease in $H_2SO_4$ in solution, was observed in sulphide precipitation for the solutions that were neutralized to pH 3.28 or greater at 25° C., with the best recoveries and lowest acid concentration when the solution feed to sulphide precipitation was neutralized to pH 3.95.

At pH 3.95, the neutralizing capacity of the solution was 1.7 g/L of $H_2SO_4$ for every 1 g/L of aluminium in solution. The mole ratio of sulphur to aluminium, after correcting for sulphur in acid and other metal sulphates in solution, in the solutions neutralized to pH 3.95 was approximately 1.0:1, which is significantly lower than the theoretical value for $Al_2(SO_4)_3$ of 1.5:1. Both the neutralizing capacity and Al:S mole ratio are consistent with the formation of the Al dimer, $Al_2(OH)_2(H_2O)_8^{4+}$, as the dominant aluminium species in solution (R. Cornelius, J. Caruso, K. Heumann, and H. Crews, "Handbook of Elemental Speciation II—Species in the Environment, Food, Medicine and Occupation Health", Wiley Interscience (Hoboken, N.J.), 2003, p. 8). (The theoretical neutralizing capacity for this polynuclear complex is 1.8 g/L $H_2SO_4$ for every 1 g/L of Al in solution.)

Example No. 2

A solution was prepared containing the following nominal composition (g/L): 5.4 Al, 0.4 Co, 0.2 $Cr^{3+}$, 1.0 $Fe^{3+}$, 1 Mg, 3.0 Mn, 4.6 Ni and 2.5 $H_2SO_4$. The solution was then neutralized to a series of pH targets at 75° C. with the addition of limestone. After neutralization, the resulting slurry was filtered to remove the precipitated solids from the solution. The following table shows the analyses of the solutions after neutralization.

| Test | Limestone Added, g/L | pH* | Neutralized Solution Analysis, g/L | | | | | | |
|---|---|---|---|---|---|---|---|---|---|
| | | | Ni | Co | Al | Cr | Fe | Mg | Mn |
| 2-N1 | 1.8 | 2.44 | 4.63 | 0.45 | 5.51 | 0.25 | 1.01 | 1.03 | 3.00 |
| 2-N2 | 2.6 | 2.68 | 4.60 | 0.44 | 5.48 | 0.25 | 0.96 | 1.02 | 2.97 |
| 2-N3 | 3.7 | 3.01 | 4.75 | 0.45 | 5.60 | 0.23 | 0.57 | 1.04 | 3.03 |
| 2-N4 | 5.8 | 3.31 | 4.92 | 0.47 | 5.66 | 0.21 | 0.28 | 1.09 | 3.14 |
| 2-N5 | 9.2 | 3.63 | 4.74 | 0.45 | 5.46 | 0.20 | 0.25 | 1.04 | 3.02 |
| 2-N6 | 16.7 | 3.84 | 4.86 | 0.44 | 5.06 | 0.20 | 0.05 | 1.25 | 4.94 |

*Measured at 25° C.

These solutions were then treated with sulphide precipitation using the same conditions as described in Example No. 1. The following table shows the results from these tests.

| Test | Feed pH | Feed Solution, g/L | | | $H_2SO_4$, g/L | | Final Solution, mg/L | | Precipitation, % | |
|---|---|---|---|---|---|---|---|---|---|---|
| | | Ni | Co | Al | Theor.[1] | Final | Ni | Co | Ni | Co |
| 2-SP1 | 2.44 | 4.63 | 0.45 | 5.51 | 11.9 | 9.7 | 43.1 | 32.2 | 99.1 | 92.8 |
| 2-SP2 | 2.68 | 4.60 | 0.44 | 5.48 | 10.6 | 9.1 | 36.9 | 37.4 | 99.2 | 91.6 |
| 2-SP3 | 3.01 | 4.75 | 0.45 | 5.60 | 10.0 | 9.4 | 32.8 | 34.5 | 99.3 | 92.3 |
| 2-SP4 | 3.31 | 4.92 | 0.47 | 5.66 | 9.4 | 7.0 | 27.8 | 39.9 | 99.4 | 91.5 |
| 2-SP5 | 3.63 | 4.74 | 0.45 | 5.46 | 9.0 | 3.9 | 45.8 | 6.5 | 99.0 | 98.5 |
| 2-SP6 | 3.84 | 4.86 | 0.44 | 5.06 | 8.9 | 0.7 | 7.4 | 1.0 | 99.8 | 99.8 |

[1]Stoichiometric acid concentration in barren liquor from precipitation of nickel and cobalt and reduction of $Fe^{3+}$ to $Fe^{2+}$ and free acid in feed solution.

A significant increase in metals recovery, particularly for cobalt, and a significant decrease in $H_2SO_4$ in solution, was observed in sulphide precipitation for the solutions that are neutralized to pH 3.6 or greater at 75° C., with the best recoveries and lowest acid when the solution feed to sulphide precipitation is neutralized to pH 3.84.

At pH 3.84, the neutralizing capacity of the solution was 1.8 g/L of $H_2SO_4$ for every 1 g/L of aluminium in solution. The mole ratio of sulphur to aluminium, after correcting for sulphur in acid and other metal sulphates in solution, in the solutions neutralized to pH 3.84 was approximately 1.0:1, which was significantly lower than the theoretical value for $Al_2(SO_4)_3$ of 1.5:1. Both the neutralizing capacity and Al:S mole ratio are again consistent with the formation of the Al dimer, $Al_2(OH)_2(H_2O)_8^{4+}$, as the dominant aluminium species in solution (Cornelius, et al, see full cite identified above). (The theoretical neutralizing capacity for this polynuclear complex is 1.8 g/L $H_2SO_4$ for every 1 g/L of Al in solution.)

Example No. 3

Solutions were prepared to the same composition as the solutions described in Example No. 2, except that the aluminium concentration in solution was varied between 0 and 10 g/L in the feed solution to neutralization. The solutions were then neutralized and filtered using the same procedure described in Example No. 2. The following table shows the analyses of the solutions after neutralization.

| Test | Limestone Added, g/L | pH | Neutralized Solution Analysis, g/L | | | | | | |
|---|---|---|---|---|---|---|---|---|---|
| | | | Ni | Co | Al | Cr | Fe | Mg | Mn |
| 3-N1 | 5.1 | 3.95 | 4.75 | 0.44 | 0.01 | 0.04 | 0.02 | 1.02 | 3.08 |
| 3-N2 | 26.3 | 3.91 | 4.51 | 0.43 | 2.92 | 0.09 | 0.06 | 1.10 | 2.94 |
| 3-N3 | 32.1 | 3.93 | 4.34 | 0.41 | 9.30 | 0.18 | 0.21 | 1.11 | 2.83 |

These solutions were then treated with sulphide precipitation using the same conditions as described in Example No. 1. The following table shows the results from these tests.

| Test | Feed pH | Feed Solution, g/L | | | $H_2SO_4$, g/L | | Final Solution, mg/L | | Precipitation, % | |
|---|---|---|---|---|---|---|---|---|---|---|
| | | Ni | Co | Al | Theor.[1] | Final | Ni | Co | Ni | Co |
| 3-SP1 | 3.95 | 4.75 | 0.44 | <0.01 | 8.6 | 9.0 | 64.8 | 9.2 | 98.6 | 97.9 |
| 3-SP2 | 3.91 | 4.51 | 0.43 | 2.92 | 8.3 | 0.9 | 17.0 | 0.7 | 99.6 | 99.8 |
| 3-SP3 | 3.93 | 4.34 | 0.41 | 9.30 | 8.3 | pH 3.4 | 23.8 | 0.6 | 99.5 | 99.9 |

[1]Stoichiometric acid concentration in barren liquor from precipitation of nickel and cobalt and reduction of $Fe^{3+}$ to $Fe^{2+}$ and free acid in feed solution.

The presence of polynuclear aluminium complexes in the feed solution to sulphide precipitation caused a significant decrease in the acidity of the barren liquor (i.e., a decrease of between 8.1 and 9.0 g/L) and increases in nickel and cobalt precipitation of up to 1% for Ni and 2% for Co.

There is a maximum aluminium concentration in solution, above which there is no additional increase in nickel and cobalt recoveries. These results indicate, though, that the addition of aluminium above this maximum aluminium concentration does not adversely affect nickel and cobalt recoveries. Effectively, this means that this process can be operated with an excess of aluminium in solution prior to raw liquor neutralization without any detrimental effects on the recoveries of nickel and cobalt in sulphide precipitation. This excess aluminium would help to buffer changes in metals recovery caused by changes in the metals concentration in the feed solutions.

Example No. 4

Solutions were prepared to the same composition as the solutions described in Example No. 2, but with a range of nickel and cobalt concentrations at two levels of aluminium concentration (0 and 5 g/L). The solutions were then neutralized and filtered using the same procedure described in Example No. 2. The following table shows the analyses of the solutions after neutralization.

|  | Limestone |  | Neutralized Solution Analysis, g/L | | | | | | |
|---|---|---|---|---|---|---|---|---|---|
| Test | Added, g/L | pH | Ni | Co | Al | Cr | Fe | Mg | Mn |
| 4-N1 | 5.1 | 3.95 | 4.75 | 0.44 | <0.01 | 0.04 | 0.02 | 1.02 | 3.08 |
| 4-N2 | 6.7 | 3.88 | 5.07 | 0.49 | <0.01 | <0.01 | <0.01 | 1.13 | 3.28 |
| 4-N3 | 6.7 | 3.96 | 5.19 | 0.57 | <0.01 | <0.01 | <0.01 | 1.07 | 2.88 |
| 3-N2 | 26.3 | 3.91 | 4.51 | 0.43 | 2.92 | 0.09 | 0.06 | 1.10 | 2.94 |
| 4-N5 | 27.2 | 3.85 | 5.68 | 0.55 | 3.22 | 0.12 | 0.07 | 1.14 | 3.02 |

These solutions were then treated with sulphide precipitation using the same conditions as described in Example No. 1. The following table shows the results from these tests.

|  | Feed | Feed Solution, g/L | | | $H_2SO_4$, g/L | | Final Solution, mg/L | | Precipitation, % | |
|---|---|---|---|---|---|---|---|---|---|---|
| Test | pH | Ni | Co | Al | Theor.[1] | Final | Ni | Co | Ni | Co |
| 4-SP1 | 3.95 | 4.75 | 0.44 | <0.01 | 8.6 | 9.0 | 64.8 | 9.2 | 98.6 | 97.9 |
| 4-SP2 | 3.88 | 5.07 | 0.49 | <0.01 | 9.0 | 8.2 | 120.0 | 34.0 | 97.6 | 93.0 |
| 4-SP3 | 3.96 | 5.19 | 0.57 | <0.01 | 9.4 | 10.5 | 88.0 | 73.0 | 98.3 | 87.1 |
| 3-SP2 | 3.91 | 4.51 | 0.43 | 2.92 | 8.3 | 0.9 | 17.0 | 0.7 | 99.6 | 99.8 |
| 4-SP5 | 3.85 | 5.68 | 0.55 | 3.22 | 10.3 | 2.7 | 106.0 | 8.9 | 98.1 | 98.4 |

[1]Stoichiometric acid concentration in barren liquor from precipitation of nickel and cobalt and reduction of $Fe^{3+}$ to $Fe^{2+}$ and free acid in feed solution.

The first three tests show that increased nickel and cobalt concentrations in the feed solution cause significant decreases in nickel and, particularly, cobalt recovery in sulphide precipitation, even with relatively small increases of less than 0.6 g/L Ni+Co in solution (i.e., increase of 7 to 11% in the feed metals concentration).

The last two tests show that the addition of aluminium prior to raw liquor neutralization allows high nickel and cobalt recoveries to be maintained with a much larger increase in the metals concentrations in the feed of 1.30 g/L Ni+Co in solution (i.e., an increase of over 25% in the feed metals concentration).

Example No. 5

The following example describes the results of a seven-day continuous laterite leach pilot plant campaign. This campaign involved the treatment of high aluminium ores through several stages of the described flowsheet for treating laterite ores, including pressure acid leaching, slurry neutralization, countercurrent decantation (CCD) washing and raw liquor neutralization. The raw liquor neutralization circuit, in particular, was operated at 85° C. using limestone as the neutralizing agent to produce a final slurry of between pH 3.6 and pH 3.9.

Figure 2:
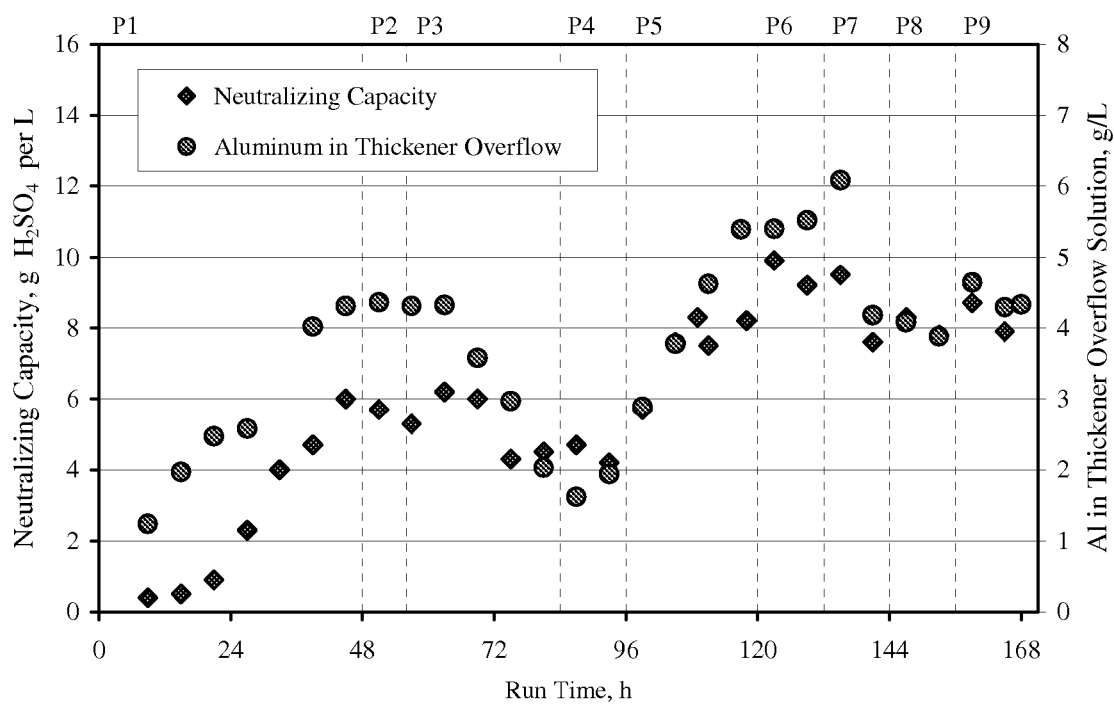
FIG. 2 is a graph illustrating the neutralizing capacity for the raw liquor thickener overflow solution samples plotted versus run time.

Samples of the thickener overflow solution from this circuit were taken at regular intervals throughout the seven days of operation and these samples were analyzed to determine the acid neutralizing capacity of these solutions. The acid neutralization capacity of these solutions was determined by mixing equal volumes of thickener overflow solution and 10 g/L sulphuric acid solution and then back titrating the combined solution to determine the amount of free acid remaining in solution. The difference between the acid added and the acid titrated is reported as the acid neutralization capacity of the solution (i.e. grams of $H_2SO_4$ per liter of the original solution). The acid neutralization capacity for the raw liquor thickener overflow solution samples is plotted versus run time in FIG. 2. Vertical lines on the plot define separate operating periods during the pilot plant campaign. Differences in pilot plant operation during these separate periods were largely related to changes in the pressure leach feed composition or operating conditions.

There was a good correlation between the neutralizing capacity of the solution and the aluminium concentration in the thickener overflow solution, particularly in the later periods of operation. The ratio of neutralizing capacity to aluminium in solution (i.e., g acid neutralized/g aluminium in solution) for Periods 2 to 7 (48 to 144 h run time) was 1.81:1, which is very close to the theoretical ratio of neutralizing capacity to aluminium in solution for the simplest polynuclear species, $Al_2(OH)_2(H_2O)_8^{4+}$, of 1.82:1.

These results show that the conditions proposed for raw liquor neutralization can effectively produce basic aluminium species in solution (e.g. polynuclear aluminium hydroxide complexes), which have a much higher capacity for neutralizing acid than would be expected from the solution pH, on a large scale in continuous operation. At the concentrations of aluminium in solution in these tests, these solutions should be able to neutralize most, if not all, of the acid produced in sulphide precipitation.

In the above description, for purposes of explanation, numerous details are set forth in order to provide a thorough understanding of the present disclosure. However, it will be apparent to one skilled in the art that these specific details are not required in order to practice the present disclosure. Although certain numerical quantities and materials are described for implementing the disclosed example embodiments, other suitable numerical quantities and/or materials may be used within the scope of this disclosure. All such modifications and variations, including all suitable current and future changes in technology, are believed to be within the sphere and scope of the present disclosure. All references mentioned are hereby incorporated by reference in their entirety.

What is claimed is:

1. A method of treating a metalliferrous material, comprising:
    supplying a metalliferrous material including at least one target metallic element;
    solubilising the metalliferrous material so as to effect production of an intermediate product including an operative solution, wherein the operative solution includes a solvent component and a solute component, and wherein the solute component includes at least one solute component-based target metallic element and each one of the at least one solute component-based target metallic element corresponds to one of the at least one target metallic element of the metalliferrous material such that the operative solution includes at least one target metallic element;
    contacting the operative solution with an operative reagent in an operative reaction zone so as to effect production of a product mixture including an operative reaction product and hydronium ion, wherein the operative reaction product includes at least one operative reaction product-based target metallic element and each one of the at least one operative reaction product-based target metallic element corresponds to one of the at least one solute component-based target metallic element of the operative solution, wherein the operative solution being contacted in the operative reaction zone includes a total molar quantity of target metallic element in the operative reaction zone, wherein each one of the at least one solute component-based target metallic element includes a respective target metallic element molar quantity in the operative reaction zone, such that at least one respective target metallic element molar quantity is supplied in the operative reaction zone, and wherein the total moles of target metallic element in the operative reaction zone is the sum of the at least one respective target metallic element molar quantity in the operative reaction zone; and
    supplying at least one hydronium ion depletion agent in the operative reaction zone such that contacting between any one of the at least one hydronium ion depletion agent and the hydronium ion in the operative reaction zone effects a reactive process which consumes the hydronium ion, wherein each one of the at least one hydronium ion depletion agent includes at least one dissolved aluminium complex material and each one of the at least one dissolved aluminium complex material includes a respective molar quantity of operative aluminium in the operative reaction zone such that each one of the at least one hydronium ion depletion agent includes at least one respective molar quantity of operative aluminium in the operative reaction zone, and such that each one of the at least one hydronium ion depletion agent includes a subtotal operative aluminium molar quantity in the operative reaction zone defined by the sum of the respective at least one respective molar quantity of operative aluminium in the operative reaction zone such that at least one subtotal operative aluminium molar quantity in the operative reaction zone is supplied, and wherein a total moles of operative aluminium in the operative reaction zone is the sum of the at least one subtotal operative aluminium molar quantity in the operative reaction zone;
    wherein the ratio of: (i) the total moles of operative aluminium in the operative reaction zone, to (ii) the total moles of target metallic element in the operative reaction zone, is between 0.45 and 4.4.

2. The method as claimed in claim 1, wherein at least a fraction of the hydronium ion depletion agent includes aluminium derived from the metalliferrous material.

3. The method as claimed in claim 1, wherein at least a fraction of the dissolved aluminium complex material is a polynuclear aluminium compound.

4. The method as claimed in claim 1, wherein at least a fraction of the dissolved aluminium complex material is a compound of $Al_2(OH)_2(H_2O)_8^{4+}$.

5. The method as claimed in claim 1, wherein the at least one target metallic element is nickel and cobalt.

6. The method as claimed in claim 1, wherein the at least one target metallic element is nickel.

7. The method as claimed in claim 1, wherein the at least one target metallic element is cobalt.

8. The method as claimed in claim 1, wherein the metalliferrous material includes an ore.

9. The method as claimed in claim 1, wherein the metalliferrous material includes laterite ore.

10. The method as claimed in claim 1, further comprising:
    separating at least a fraction of the at least one operative reaction product from the product mixture.

11. The method as claimed in claim 10, wherein at least a fraction of the operative reaction product is a solid reaction product, and the separating is a solid-liquid separation process.

12. The method as claimed in claim 10, wherein the operative reagent includes an acid producing sulphide reagent.

13. The method as claimed in claim 12, wherein the operative reagent includes hydrogen sulphide.

14. The method as claimed in claim 1, wherein the operative solution being contacted with the operative reagent during the contacting of the operative solution with the operative reagent in the operative reaction zone is separated from the intermediate product prior to the contacting with the operative reagent.

15. The method as claimed in claim 1, wherein the operative solution is an aqueous solution.

16. The method as claimed in claim 1,
    wherein the metalliferrous material also includes aluminium;
    and wherein the solubilising of the metalliferrous material includes:
        leaching the metalliferrous material with a leachant in a leaching zone so as to effect production of a leachate including a leachate-based solute, wherein the leachate-based solute includes the at least one target metallic element and aluminium; and contacting the leachate with a neutralizing agent so as to effect production of a leachate-derived hydronium ion depletion agent, wherein each one of the at least one leachate-derived hydronium ion depletion agent includes aluminium derived from the metalliferous material;

and wherein at least a fraction of the at least one hydronium ion depletion agent supplied in the operative reaction zone is at least one of the at least one leachate-derived hydronium ion depletion agent.

17. The method as claimed in claim 16, wherein the contacting of the leachate with a neutralizing agent effects production of a neutralized solution including the at least one leachate-derived hydronium ion depletion agent.

18. The method as claimed in claim 16, wherein the pH of the neutralized solution is at least 3.3.

19. The method as claimed in claim 16, wherein the pH of the neutralized solution is between 3.8 and 4.0.

20. The method as claimed in claim 16, wherein at least a fraction of the aluminium of the metalliferous material is present within aluminium hydroxide supplied in the metalliferous material.

21. The method as claimed in claim 16, wherein the leaching includes contacting the metalliferous material with the leachant in the leaching zone to supply a leaching zone solution, wherein the pressure within the leaching zone is equal to, or greater than, the steam pressure of the leaching zone solution at the temperature of the leaching zone, and the temperature of the leaching zone is between 240° C. and 300° C.

22. The method as claimed in claim 16, wherein the leachant includes an acidic solution.

23. The method as claimed in claim 16, wherein the leachant includes sulphuric acid.

24. The method as claimed in claim 1, further comprising:
recovering aluminium-comprising residue from at least one of the solubilising or contacting steps such that recovered aluminium-comprising residue is supplied and the recovered aluminium-comprising residue includes recovered aluminium;
subjecting at least a fraction of the recovered aluminium-comprising residue to a reactive process so as to effect production of at least one aluminium-comprising residue-derived hydronium ion depletion agent, wherein each one of the at least one aluminium-comprising residue-derived hydronium ion depletion agent includes aluminium of the recovered aluminium; and
supplying at least one of the at least one aluminium-comprising residue-derived hydronium ion depletion agent to the operative reaction zone such that at least one of the at least one hydronium ion depletion agent supplied in the operative reaction zone is a one of the at least one aluminium-comprising residue-derived hydronium ion depletion agent, such that at least a fraction of the recovered aluminium is recycled.

25. The method as claimed in claim 24, wherein at least a fraction of the at least one aluminium-comprising residue is a solid.

26. The method as claimed in claim 25, wherein at least a fraction of the solid aluminium-comprising residue is aluminium hydroxide.

27. A method of treating a metalliferous material, comprising:
supplying a metalliferous material including at least one target metallic element;

solubilising the metalliferous material so as to effect production of an intermediate product including an operative solution, wherein the operative solution includes a solvent component and a solute component, and wherein the solute component includes at least one solute-based target metallic element and each one of the at least one solute-based target metallic element corresponds to one of the at least one target metallic element of the metalliferous material, such that the operative solution includes at least one target metallic element;

contacting the operative solution with an operative reagent in an operative reaction zone so as to effect production of a product mixture including an operative reaction product and hydronium ion, wherein the operative reaction product includes at least one operative reaction product-based target metallic element and each one of the at least one operative reaction product-based target metallic element corresponds to one of the at least one solute-based target metallic element of the operative solution;

supplying at least one hydronium ion depletion agent in the operative reaction zone for effecting contacting between the hydronium ion in the reaction zone and at least one of the at least one hydronium ion depletion agent, wherein the contacting between any one of the at least one hydronium ion depletion agent and the hydronium ion in the operative reaction zone effects a reactive process which consumes the hydronium ion, wherein at least one of the at least one hydronium ion depletion agent includes at least one dissolved aluminium complex material;

recovering aluminium-comprising residue from at least one of the solubilising or contacting steps such that recovered aluminium-comprising residue is supplied and the recovered aluminium-comprising residue includes recovered aluminium;

subjecting at least a fraction of the recovered aluminium-comprising residue to a reactive process so as to effect production of at least one aluminium-comprising residue-derived hydronium ion depletion agent; and supplying at least one of the at least one aluminium-comprising residue-derived hydronium ion depletion agent to the operative reaction zone such that at least a fraction of the at least one hydronium ion depletion agent supplied in the operative reaction zone includes at least one of the at least one aluminium-comprising residue-derived hydronium ion depletion agent, such that at least a fraction of the recovered aluminium is recycled.

28. The method as claimed in claim 27, wherein the operative reagent includes an acid producing sulphide reagent.

29. The method as claimed in claim 27, wherein the operative solution is an aqueous solution.

30. The method as claimed in claim 27, wherein at least a fraction of the recovered aluminium-comprising residue is acid-soluble.

31. The method as claimed in claim 27, wherein the recovered aluminium-comprising residue includes aluminium hydroxide.

32. The method as claimed in claim 29,
wherein there is supplied an operative acid-soluble solid aluminium-comprising residue, wherein the operative acid-soluble solid aluminium-comprising residue is at least a fraction of the recovered aluminium-comprising residue;
wherein the operative acid-soluble solid aluminium-comprising residue is subjected to a reactive process so as to effect production of at least one of the at least one aluminium-comprising residue-derived hydronium ion depletion agent, wherein the subjecting of the operative acid-soluble solid aluminium-comprising residue to a reactive process includes:
  contacting the operative acid-soluble solid aluminium-comprising residue with an aqueous acidic solution so as to effect solubilisation of the operative acid-soluble solid aluminium-comprising residue and thereby effect production of a dissolved residue-derived aluminium-comprising solute dissolved in aqueous acidic solution; and
  contacting the aqueous acidic solution in which the dissolved residue-derived aluminium-comprising solute is dissolved with a neutralizing agent so as to effect production of at least a fraction of the at least one aluminium-comprising residue-derived hydronium ion depletion agent.

33. The method as claimed in claim 32, wherein the aqueous acidic solution in which the dissolved residue-derived aluminium-comprising solute is dissolved includes 0.05 to 50 g/L $H_2SO_4$.

34. The method as claimed in claim 32, wherein the aqueous acidic solution in which the dissolved residue-derived aluminium-comprising solute is dissolved includes 0.05 to 10 g/L $H_2SO_4$.

35. The method as claimed in claim 32, wherein the aqueous acidic solution, with which the operative acid-soluble solid aluminium-comprising residue is contacted, is an aqueous solution including dissolved sulphuric acid.

36. The method as claimed in claim 32, wherein at least a fraction of the operative acid-soluble solid aluminium-comprising residue is aluminium hydroxide.

37. The method as claimed in claim 32,
  wherein the metalliferrous material also includes a metalliferrous material-based aluminium-comprising component, wherein the metalliferrous material-based aluminium comprising component includes metalliferrous material-based aluminium;
  and wherein the solubilising includes:
    leaching the metalliferrous material with a leachant so as to effect production of a leachate including a dissolved metalliferrous material-derived aluminium comprising solute, wherein the dissolved metalliferrous material-derived aluminium comprising solute includes aluminium of the metalliferrous material-based aluminium;
    subjecting at least a fraction of the dissolved metalliferrous material-derived aluminium comprising solute to a reactive process so as to effect production of at least one metalliferrous material-derived hydronium ion depletion agent, wherein each one of the at least one metalliferrous material-derived hydronium ion depletion agent includes aluminium of the metalliferrous material-based aluminium;
  wherein at least a fraction of the at least one hydronium ion depletion agent supplied in the operative reaction zone includes at least one of the at least one metalliferrous material-derived hydronium ion depletion agent; and
  wherein the leachant includes the aqueous acidic solution with which the operative acid-soluble solid aluminium-comprising residue is contacted.

38. The method as claimed in claim 27,
  wherein the metalliferrous material also includes a metalliferrous material-based aluminium-comprising component, wherein the metalliferrous material-based aluminium-comprising component includes metalliferrous material-based aluminium;
  and wherein the solubilising includes:
    leaching the metalliferrous material with a leachant including an aqueous acidic solution so as to effect production of a leachate including a dissolved metalliferrous material-derived aluminium comprising solute, wherein the dissolved metalliferrous material-derived aluminium comprising solute includes aluminium of the metalliferrous material-based aluminium; and
    subjecting at least a fraction of the dissolved metalliferrous material-derived aluminium comprising solute to a reactive process so as to effect production of at least one metalliferrous material-derived hydronium ion depletion agent, wherein each one of the at least one metalliferrous material-derived hydronium ion depletion agent includes aluminium of the metalliferrous material-based aluminium;
  wherein at least a fraction of the at least one hydronium ion depletion agent supplied in the operative reaction zone includes at least one of the at least one metalliferrous material-derived hydronium ion depletion agent.

39. The method as claimed in claim 38, wherein at least a fraction of the metalliferrous material-based aluminium-comprising component includes aluminium hydroxide.

40. The method as claimed in claim 38, wherein the subjecting of at least a fraction of the dissolved metalliferrous material-derived aluminium-comprising solute to a reactive process so as to effect production of at least one metalliferrous material-derived hydronium ion depletion agent includes contacting the leachate with a neutralizing agent.

41. The method as claimed in claim 27, further comprising:
  separating a target metallic element depleted solution product from the product mixture;
  contacting the target metallic element depleted solution product with a neutralizing agent in a residual product treatment zone to effect production of a residual slurry including a residual operative solution and target metallic element depleted solution product-derived solid aluminium comprising residue;
wherein the recovered aluminium-comprising residue includes at least a fraction of the target metallic element depleted solution product-derived solid aluminium-comprising residue.

42. The method as claimed in claim 41, wherein the pH of the residual operative solution is between 3 and 7.

43. The method as claimed in claim 41, wherein the pH of the residual operative solution is between 4 and 5.

44. The method as claimed in claim 41,
  wherein the metalliferrous material also includes a metalliferrous material-based aluminium-comprising component, wherein the metalliferrous material-based aluminium comprising component includes metalliferrous material-based aluminium;
  and wherein the solubilising includes:
    leaching the metalliferrous material with a leachant including an aqueous acidic solution so as to effect production of an intermediate slurry product including a leachate, wherein the leachate includes a dissolved metalliferrous material-derived aluminium-comprising solute, wherein the dissolved metalliferrous material-derived aluminium-comprising solute includes aluminium of the metalliferrous material-based aluminium;
    contacting the leachate with a neutralizing agent so as to effect production of a leachate-derived operative solution and a post-neutralization solid residue, wherein the leachate-derived operative solution includes at least one metalliferrous material-derived hydronium ion depletion agent, wherein each one of the at least one metalliferrous material-derived hydronium ion depletion agent includes aluminium of the metalliferous material-based aluminium, and wherein at least a fraction of the at least one hydronium ion depletion agent supplied in the operative reaction zone includes at least one of the at least one metalliferous material-derived hydronium ion depletion agent.

45. The method as claimed in claim 44, wherein the contacting of the leachate with a neutralizing agent includes:
contacting the intermediate slurry product with a neutralizing agent in a first neutralization zone so as to effect production of a treated intermediate slurry product;
separating a leachate-derived intermediate operative solution from the treated intermediate slurry product in a separation zone;
contacting the leachate-derived intermediate operative solution with a neutralizing agent in a second neutralization zone so as to effect the production of a leachate-derived operative solution.

46. The method as claimed in claim 45, wherein the pH of the leachate-derived operative solution is between 3.3 and 4.0.

47. The method as claimed in claim 45, wherein the pH of the leachate-derived operative solution is between 3.8 and 4.0.

48. The method as claimed in claim 45, further comprising:
supplying at least a fraction of the residual operative solution to the separation zone as a wash solution;
contacting the wash solution with the treated intermediate slurry product in the separation zone so as to effect mass transfer of dissolved material from the treated intermediate slurry product to the wash solution so as to effect production of the leachate-derived intermediate operative solution.

49. The method as claimed in claim 48, wherein the contacting is effected while the wash solution is flowing through the separation zone.

50. The method as claimed in claim 48, wherein the contacting is effected while the treated intermediate slurry product is flowing though the separation zone in a direction opposite to that of the flowing of the wash solution.

51. The method as claimed in claim 27,
wherein the metalliferous material also includes a metalliferous material-based aluminium-comprising component, wherein the metalliferous material-based aluminium-comprising component includes metalliferous material-based aluminium;
and wherein the solubilising includes:
leaching the metalliferous material with a leachant including an aqueous acidic solution so as to effect production of an intermediate slurry product including a leachate, wherein the leachate includes a dissolved metalliferous material-derived aluminium-comprising solute, wherein the dissolved metalliferous material-derived aluminium-comprising solute includes aluminium of the metalliferous material-based aluminium;
contacting the intermediate slurry product with a neutralizing agent in a first neutralization zone so as to effect production of a treated intermediate slurry product,
separating a leachate-derived intermediate operative solution from the treated intermediate slurry product in a separation zone; and
contacting the leachate-derived intermediate operative solution with a neutralizing agent in a second neutralization zone so as to effect production of a leachate-derived operative solution and a post-neutralization aluminium-comprising solid residue, wherein the leachate-derived operative solution includes at least one metalliferous material-derived hydronium ion depletion agent, wherein each one of the at least one metalliferous material-derived hydronium depletion agent includes aluminium of the metalliferous material-based aluminium, and wherein at least a fraction of the at least one hydronium ion depletion agent supplied in the operative reaction zone includes at least one of the at least one metalliferous material-derived hydronium ion depletion agent;
wherein the recovered aluminium-comprising residue includes at least a fraction of the post-neutralization aluminium-comprising solid residue.

52. The method as claimed in claim 51, wherein the pH of the leachate-derived operative solution is between 3.3 and 4.0.

53. The method as claimed in claim 51, wherein the pH of the leachate-derived operative solution is between 3.8 and 4.0.

54. The method as claimed in claim 51, wherein the at least a fraction of the post-neutralization aluminium-comprising solid residue, which is included in the recovered aluminium-comprising residue, is soluble in the aqueous acidic solution with which the metalliferous material is contacted.

55. The method as claimed in claim 51, wherein the at least a fraction of the post-neutralization aluminium-comprising solid residue, which is included in the recovered aluminium-comprising residue, includes aluminium hydroxide.

56. A method of treating a metalliferous material, comprising:
leaching a metalliferous material with a leachant in a leaching zone so as to effect production of a leachate including a leachate-based solute, wherein the metalliferous material includes at least one target metallic element and aluminium, and wherein the leachate-based solute includes the at least one target metallic element and aluminium; and
contacting the leachate with a neutralizing agent so as to effect production of a neutralized solution including a leachate-derived hydronium ion depletion agent, wherein the leachate-derived hydronium ion depletion agent includes aluminium derived from the metalliferous material;
wherein the pH of the neutralized solution is between 3.3 and 4.0.

57. The method as claimed in claim 56, further comprising:
contacting the neutralized solution with an acid-producing sulphide reagent.

58. The method as claimed in claim 56,
wherein the leachant includes an acidic solution.

59. The method as claimed in claim 56,
wherein the leaching contacting the leachate with a neutralizing agent includes:
contacting an intermediate slurry product with a neutralizing agent in a first neutralization zone
wherein the leaching of the metalliferous material effects effects production of an intermediate slurry product including the leachate;
and wherein the contacting the leachate with a neutralizing agent includes:
contacting an intermediate slurry product with a neutralizing agent in a first neutralization zone so as to effect production of a treated intermediate slurry product;
separating a leachate-derived intermediate operative solution from the treated intermediate slurry product in a separation zone; and contacting the leachate-derived intermediate operative solution with a neutralizing agent in a second neutralization zone so as to effect production of the neutralized solution.

60. The method as claimed in claim 59, further comprising: contacting the neutralized solution with an acid-producing sulphide reagent.

61. The method as claimed in claim 56, wherein the pH of the neutralized solution is between 3.8 and 4.0.

62. The method as claimed in claim 61, further comprising: contacting the neutralized solution with an acid-producing sulphide reagent.

* * * * *

UNITED STATES PATENT AND TRADEMARK OFFICE
CERTIFICATE OF CORRECTION

| | |
|---|---|
| PATENT NO. | : 8,147,781 B2 |
| APPLICATION NO. | : 12/556288 |
| DATED | : April 3, 2012 |
| INVENTOR(S) | : Michael Joseph Collins et al. |

It is certified that error appears in the above-identified patent and that said Letters Patent is hereby corrected as shown below:

On the Title page, item (75) Inventors, please switch first and second named inventors from "Preston Carl Holloway, Edmonton (CA); Michael Joseph Collins, Fort Saskatchewan (CA);" to -- Michael Joseph Collins, Fort Saskatchewan (CA); Preston Carl Holloway, Edmonton (CA); --

Signed and Sealed this
Eleventh Day of December, 2012

David J. Kappos
*Director of the United States Patent and Trademark Office*